Dec. 21, 1948.   T. J. WILLIAMS   2,457,075
FISHING POLE
Filed Sept. 19, 1946
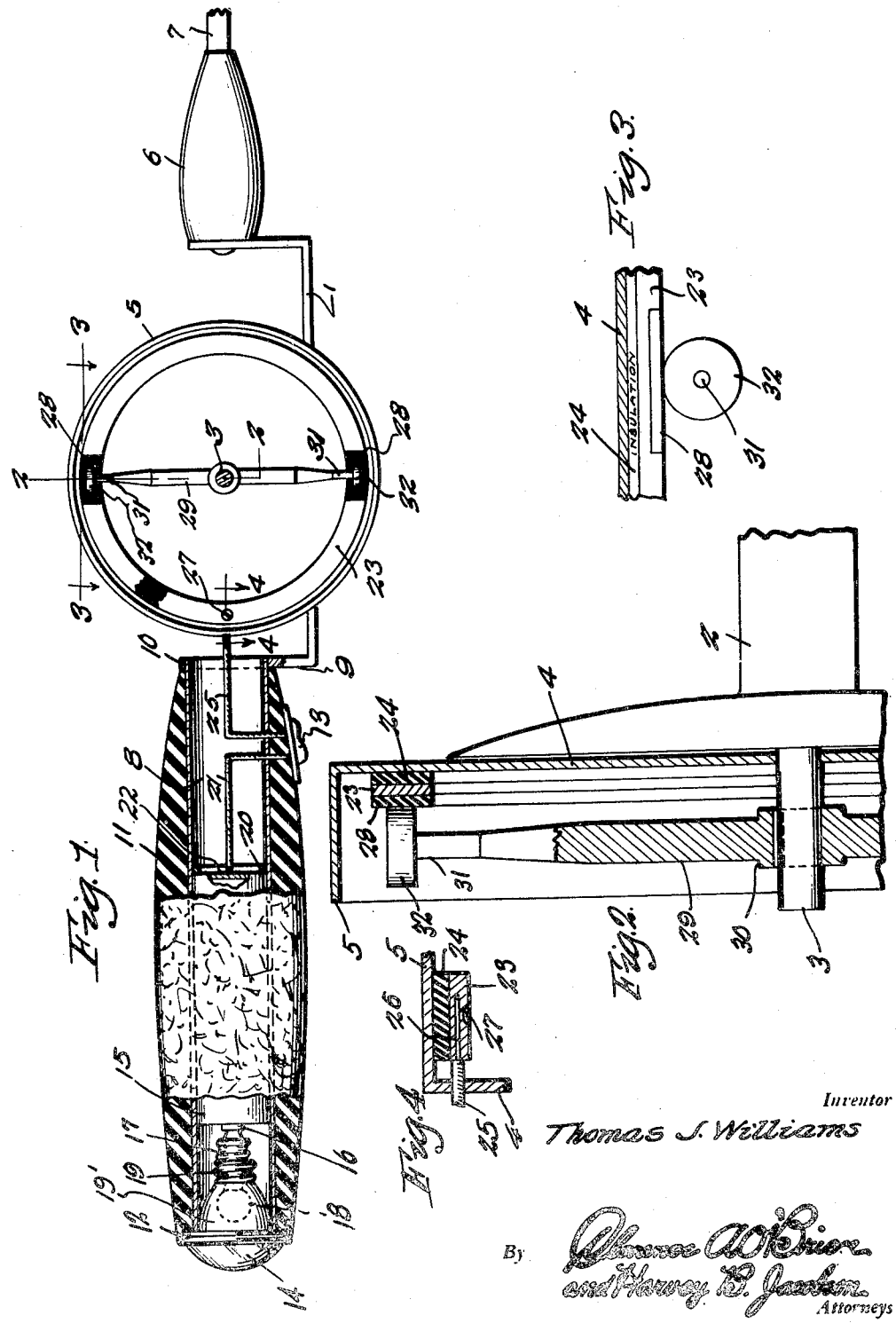
Inventor
Thomas J. Williams
By
*Clarence A. O'Brien*
*and Harvey B. Jacobson*
Attorneys Patented Dec. 21, 1948

2,457,075

UNITED STATES PATENT OFFICE 2,457,075

FISHING POLE

Thomas J. Williams, Gas City, Ind.

Application September 19, 1946, Serial No. 697,977

3 Claims. (Cl. 43—17)

My invention relates to improvements in fishing poles, and more particularly to flashlights therefor.

The primary object of my invention is to provide a fishing pole with an inexpensive, simply constructed flashlight for signalling at night a bite or nibble on the line.

Another object is to provide a fishing pole having a reel therein with flashlight equipment operated by the reel to signal that the reel is revolving so that the fisherman will know, without depending solely upon his sense of feel, that a fish is biting, or nibbling, while the fisherman is engaged in night fishing.

Other and subordinate objects, also comprehended by my invention, together with the precise nature of my improvements will be readily understood when the succeeding description and claims are read with reference to the drawings accompanying and forming part of this specification.

In said drawings:

Figure 1 is a fragmentary view partly in side elevation and partly in longitudinal section of a fishing pole equipped according to my invention.

Figure 2 is a fragmentary view in vertical section taken on the line 2—2 of Figure 1 and drawn to a larger scale.

Figure 3 is a fragmentary view in horizontal section taken on the line 3—3 of Figure 1 and drawn to a larger scale.

Figure 4 is a similar view taken on the line 4—4 of Figure 1.

Reference being had to the drawing by numerals, in the preferred illustrated embodiment thereof, my improvements have been shown as forming part of a fishing pole of the type having a substantially U-shaped reel seat 1, of bar-like metal which is an electrical conductor. A reel 2 is mounted in the seat 1 with the reel spindle 3 journalled at one side of the reel in a circular, front, mounting plate 4 comprising part of the reel mounting, and which is formed with a circumferential, forwardly projecting flange 5. The reel spindle 3 forwardly of said plate 4 is designed to be connected in the usual manner to a crank, or handle for operating the reel, but, since the crank and the reel mounting, per se, form no part of my invention, it has not been deemed necessary to illustrate the same. A socket 6 for the rod section 7 projects forwardly from the reel seat 1.

According to my invention, a tubular core 8, of conductive metal, extends rearwardly from the rear end 9 of the reel seat 1, with the front end thereof suitably fixed, as by welding, not shown, in an aperture 10 in said rear end 9. A handle section 11, of tubular form and insulation material, is fitted on said core 8 against said rear end 9 and suitably secured thereto. The butt-end of the handle section 11 has formed therein an internal annular seat 12 for a purpose presently seen.

A switch 13, of any conventional slide-button type, is suitably fixed to the bottom of the handle section 11 adjacent the front end thereof.

A lens 14, preferably of Celluloid, is threaded into the seat 12, and which may be of any suitable form to glow dimly when illuminated from within the core 8.

A dry cell 15 is slidably fitted in the core 8 with one pole 16 in contact with the shank 17 of a flashlight bulb, shown in dotted lines at 18, said shank being threaded in a socket 19, of conductive metal, having a rearwardly bearing portion 19' fitted in the rear end of the core 8 in contact with the same and against which the lens 14 is turned to hold the shank 17 against said pole 16 and the dry cell 15 against an internal shoulder 20 in said core 8. A lead wire 21 extends from the other pole 22 of the dry cell 15 to one side of the switch 13.

A circuit controller for causing, under rotation of the reel 2, flash illumination of the lens 14 is provided on said reel 2 and the previously described front mounting plate 4, and which will now be described.

Suitably fixed on the mounting plate 4, on the front face thereof, and concentric to the reel spindle 3 is a flat contact ring 23 backed by a ring 24 of insulation interposed between the same and the front mounting plate 4. An insulated lead wire 25 extends from the other side of the switch 13 out of the front end of the core 8 and is extended through the back of said mounting plate 4 with its terminal inserted in a bore 26 in said ring 23 and clamped therein by a screw 27 countersunk in said plate. A pair of inserts 28, of insulation material, are set into the contact ring 23 and suitably fixed therein flush therewith in diametrically opposite relation and in ninety degree angular relation to screw 27.

A wiper arm 29, of conductive material, is suitably fixed on the spindle 3 within the flange 5 by a hub 30, said arm extending diametrically of the reel 2 and having reduced ends 31 equipped with rollers 32 of conductive material which are adapted to track around the contact ring 23.

The manner in which the described invention is designed to operate will be readily understood.

The switch 13 being closed, and the reel 2 being revolved by a pull on the line, not shown, the wiper arm 29 is revolved by the spindle 3 to move the rollers 32 around the contact ring 23. While the rollers 32 ride on the contact ring 23 between the inserts 28, a circuit is completed in which the current passes from one side of the dry cell 15 to one side of the bulb 18, and from the other side of the bulb 18 to the core 8 by way of the socket portion 19'. From the core 8, the current then passes through the reel seat 1 and the reel 2 to the wiper arm 29 and rollers 32 to the contact ring 23 and from said ring back to the other side of the dry cell 15 by way of the lead wire 25, switch 13 and lead wire 21. When the rollers 32 ride over the inserts 28, the circuit is broken and thus the circuit is alternately closed and opened and flash illumination of the lens 14 occurs. This flash illumination signals to the fisherman while fishing at night of a bite or nibble on the line.

As stated in the foregoing, the lens 14 is designed to glow dimly under illumination. This is for the purpose of preventing the flash from attracting fish, flashlights on fishing poles being prohibited in many localities for that reason.

The foregoing will, it is believed, suffice to impart a clear understanding of my invention, without further explanation.

Manifestly, modifications of the invention may be resorted to without departing from the inventive concept, and right is herein reserved to such modifications as fall within the scope of the appended claims.

What I claim is:

1. The combination with a fishing pole having a handle, of a reel on the pole, a lens in the rear end of the handle, and means operative under control of said reel to intermittently illuminate said lens from within said handle when the reel is revolving, said means comprising an electric light in said handle, a contact ring fixed to the fishing pole and electrically connected to one side of the electric light with a battery in the line of connection, said ring having circumferentially spaced insulation inserts therein, and a conductive member revolved by said reel in wiping engagement with said ring and electrically connected to the other side of the electric light.

2. The combination with a fishing pole having a handle, of a reel on the pole, a lens in the rear end of the handle, and means operative under control of said reel to intermittently illuminate said lens from within said handle when the reel is revolving comprising a dry cell in said handle, an electric light in the handle having one side in electrical connection with one pole of said cell, a contact ring fixed to the fishing pole concentric to said reel and insulated therefrom with insulation inserts therein spaced apart circumferentially thereof, a lead line connecting the other pole of the cell with said ring intermediate said inserts, and an arm of conductive material operative by said reel to be revolved around said ring in wiping engagement therewith, said arm being electrically connected through said reel to the other side of said light.

3. The combination with a fishing pole having a handle, of a reel on the pole, a lens in the rear end of the handle, and means operative under control of said reel to intermittently illuminate said lens from within said handle when the reel is revolving, comprising a dry cell in said handle, an electric light in the handle having one side in electrical connection with one pole of said cell, a contact ring fixed to the fishing pole concentric to said reel and insulated therefrom with insulation inserts therein spaced apart circumferentially thereof, a lead line connecting the other pole of the cell with said ring intermediate said inserts, an arm of conductive material operative by said reel to be revolved around said ring in wiping engagement therewith, said arm being electrically connected throught said reel to the other side of said light, and a switch on said handle interposed in said lead line.

THOMAS J. WILLIAMS.

REFERENCES CITED

The following references are of record in the file of this patent:

UNITED STATES PATENTS

| Number | Name | Date |
|---|---|---|
| 879,640 | Hockenberry | Feb. 18, 1908 |
| 1,836,034 | Luchansky | Dec. 15, 1932 |
| 2,145,929 | Herman | Feb. 7, 1939 |
| 2,409,988 | Schwebs | Oct. 22, 1946 |